(12) United States Patent
Lee et al.

(10) Patent No.: US 10,614,981 B2
(45) Date of Patent: Apr. 7, 2020

(54) POLE COMPONENT ASSEMBLY FOR CIRCUIT BREAKER

(71) Applicant: LSIS CO., LTD., Anyang-si, Gyeonggi-do (KR)

(72) Inventors: Han-Joo Lee, Anyang-si (KR); Hong-Ik Yang, Anyang-si (KR); Kil-Young Ahn, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/192,257

(22) Filed: Nov. 15, 2018

(65) Prior Publication Data

US 2019/0355535 A1 Nov. 21, 2019

(30) Foreign Application Priority Data

May 16, 2018 (KR) .......................... 10-2018-0055889

(51) Int. Cl.
*H01H 9/02* (2006.01)
*H01H 33/662* (2006.01)
(Continued)

(52) U.S. Cl.
CPC . *H01H 33/66207* (2013.01); *B29C 45/14639* (2013.01); *H01H 9/02* (2013.01);
(Continued)

(58) Field of Classification Search
CPC .............. H01H 33/66207; H01H 9/02; H01H 33/6606; H01H 2009/0285;
(Continued)

(56) References Cited

U.S. PATENT DOCUMENTS 5,321,221 A * 6/1994 Rozier ................. H01H 1/5833
218/2
5,917,167 A * 6/1999 Bestel ..................... B29C 63/18
218/138

(Continued)

FOREIGN PATENT DOCUMENTS

CN 201038048 Y 3/2008
CN 202839444 U 3/2013
(Continued)

OTHER PUBLICATIONS

European Search Report for related European Application No. 1820320.2; action dated Mar. 28, 2019; (7 pages).

*Primary Examiner* — Truc T Nguyen
(74) *Attorney, Agent, or Firm* — K&L Gates LLP (57) ABSTRACT

Disclosed herein is a pole component assembly for a circuit breaker. The pole component assembly for a circuit breaker includes an external insulating housing made by injecting resin into a housing mold, applying injection pressure to mold the injected resin, and separating the molded resin from the housing mold, and a circuit breaker portion assembly detachably inserted into the external insulating housing after the external insulating housing is made. According to embodiments of the present disclosure, the external insulating housing is molded without a main circuit breaker component when manufacturing a sealed type pole component, and the main circuit breaker component is assembled into the finished external insulating housing, thereby preventing the main circuit breaker component from being contaminated or damaged.

10 Claims, 10 Drawing Sheets

(51) Int. Cl.
*B29C 45/14* (2006.01)
*H01H 33/66* (2006.01)
*B29L 31/34* (2006.01)

(52) U.S. Cl.
CPC .. *H01H 33/6606* (2013.01); *B29L 2031/3443* (2013.01); *H01H 2009/0285* (2013.01); *H01H 2033/6623* (2013.01)

(58) Field of Classification Search
CPC ...... H01H 2033/6623; B29C 45/14639; B29L 2031/3443
See application file for complete search history.

(56) References Cited

U.S. PATENT DOCUMENTS

| | | | | |
|---|---|---|---|---|
| 8,658,930 | B2* | 2/2014 | Shang | H01H 33/66207 218/119 |
| 8,677,609 | B2 | 3/2014 | Shang | |
| 8,785,802 | B2* | 7/2014 | Shang | H01H 33/66207 218/120 |
| 9,633,802 | B2* | 4/2017 | Chapelle | H01H 9/346 |
| 2004/0155014 | A1* | 8/2004 | Schreiber | H01H 33/027 218/138 |
| 2006/0011589 | A1* | 1/2006 | Hering | H01H 33/66207 218/118 |
| 2007/0235415 | A1* | 10/2007 | Claus | H01H 33/66207 218/139 |
| 2008/0142485 | A1* | 6/2008 | Gentsch | B29C 45/14639 218/118 |
| 2011/0120976 | A1* | 5/2011 | Gentsch | H01H 9/52 218/139 |
| 2012/0292163 | A1* | 11/2012 | Reuber | H01H 33/66207 200/293 |
| 2013/0008765 | A1* | 1/2013 | Gentsch | H01H 33/666 200/293 |
| 2014/0138357 | A1* | 5/2014 | Kasza | H01H 11/00 218/134 |
| 2016/0126037 | A1* | 5/2016 | Gerovac | H01H 33/6606 218/139 |
| 2017/0207039 | A1 | 7/2017 | Pohle | |

FOREIGN PATENT DOCUMENTS

| | | |
|---|---|---|
| CN | 105761978 A | 7/2016 |
| EP | 2034502 A1 | 3/2009 |
| JP | H0644875 A | 2/1994 |
| KR | 1020100061597 A | 6/2010 |
| KR | 1020110108868 A | 10/2011 |

* cited by examiner

[Fig. 1]

(PRIOR ART)

[Fig. 2]

(PRIOR ART)

[Fig. 3]

(PRIOR ART)

[Fig. 4]

(PRIOR ART)

POLE COMPONENT ASSEMBLY FOR CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2018-0055889, filed on May 16, 2018, whose entire disclosure is herein incorporated by reference.

BACKGROUND

1. Field of the Invention

The present disclosure relates to a pole component assembly for a circuit breaker capable of preventing a main circuit breaker component from being contaminated or deformed.

2. Description of Related Art

Industrial settings such as power plants and substations are equipped with a switchboard for various purposes such as operation and control of electric power, driving of an electric motor and the like.

A circuit breaker and various electronic devices are installed in an enclosure of the switchboard. In general, the circuit breaker is accommodated in a circuit breaker room of the switchboard.

When an ambient environment is poor due to temperature, humidity, dust, and the like, a surface of a circuit breaker portion within a main circuit portion is likely to be contaminated.

Accordingly, an accident in which an electric circuit is formed on the surface is highly likely to occur. Therefore, in such an environment, it is preferable to use a pole component having a structure in which the surface of a main circuit breaker portion is sealed.

Figure 1:
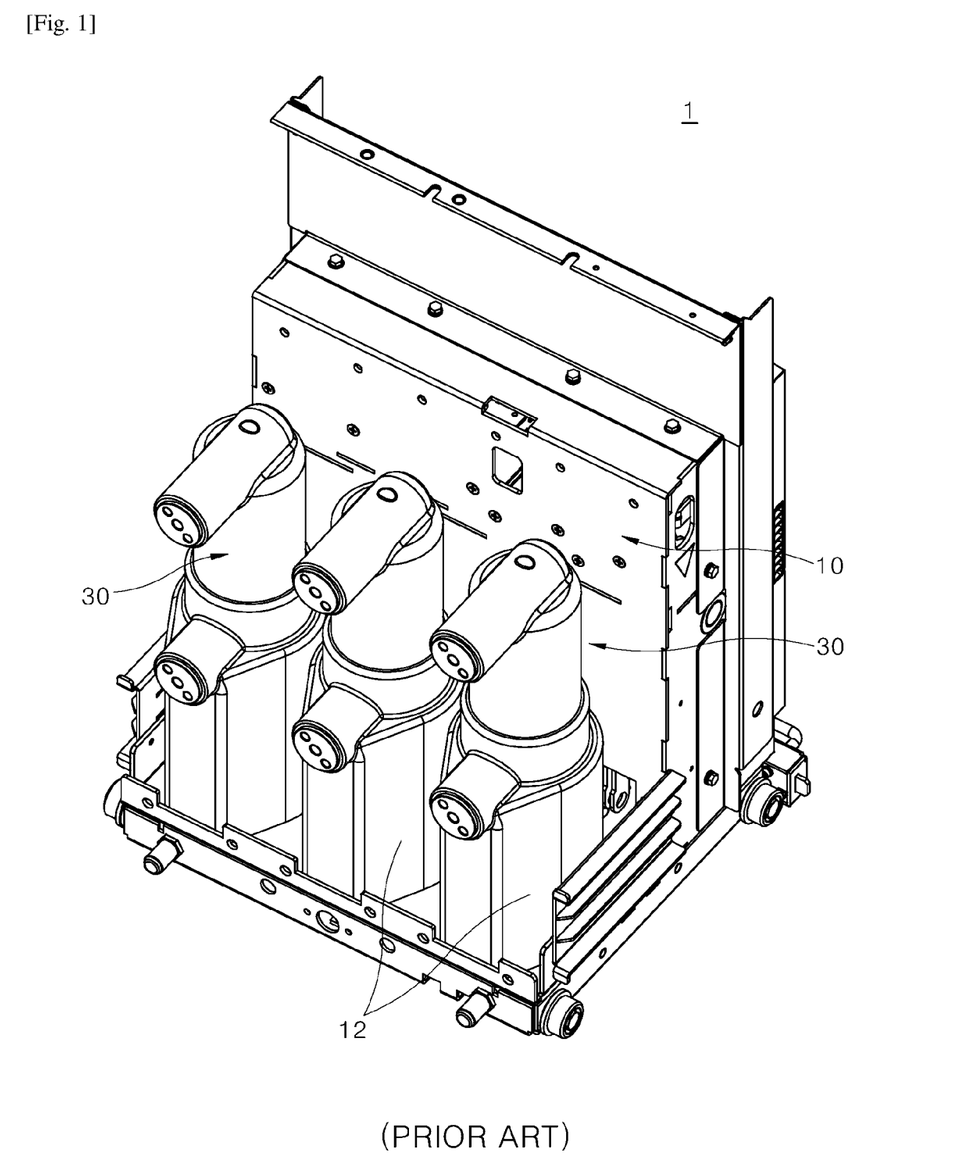
FIG. 1 is a perspective view showing a conventional sealed type vacuum circuit breaker.
Figure 2:
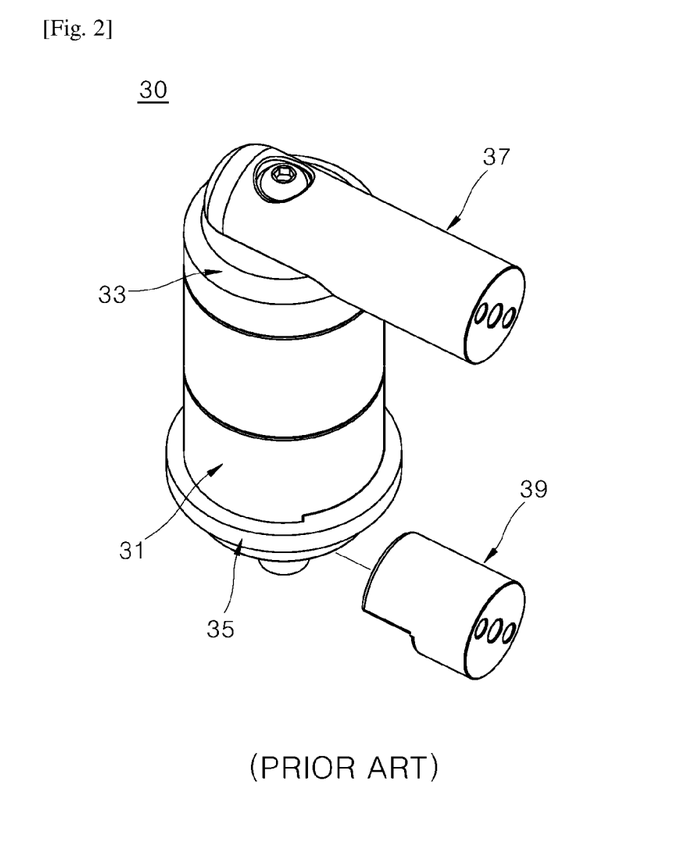
FIG. 2 is a perspective view showing internal components of the vacuum circuit breaker of FIG. 1.
Figure 3:
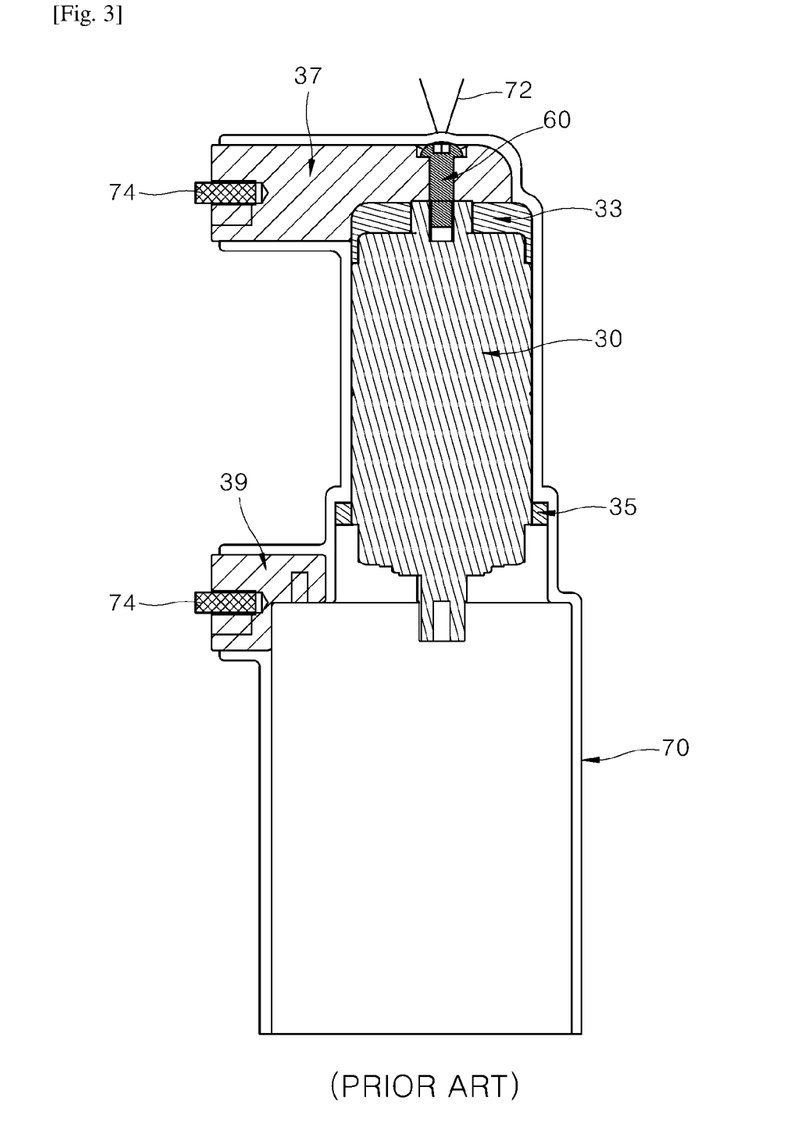
FIGS. 3 and 4 are each a sectional view showing a method of manufacturing the vacuum circuit breaker of FIG. 1.
Figure 4:
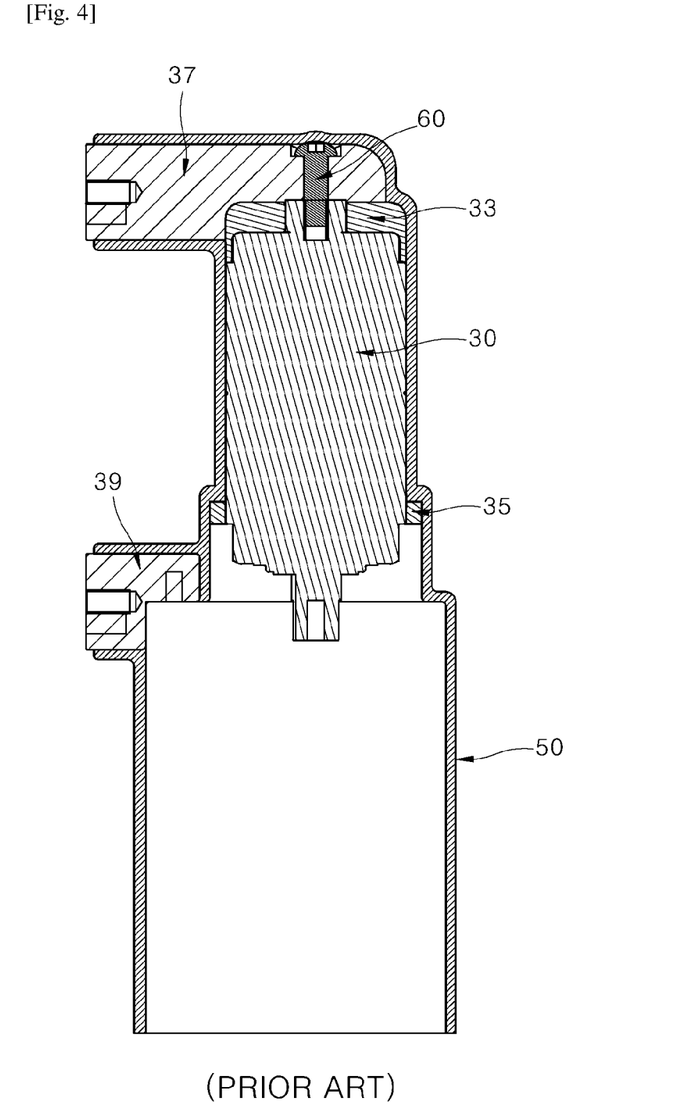

FIG. 1 is a perspective view showing a conventional sealed type vacuum circuit breaker. FIG. 2 is a perspective view showing internal components of the vacuum circuit breaker of FIG. 1. FIGS. 3 and 4 are each a sectional view showing a method of manufacturing the vacuum circuit breaker of FIG. 1.

As shown in FIGS. 1 and 2, a sealed type vacuum circuit breaker 1 may be provided with a frame 10 to support a pole component. A plurality of pole components 30 may be assembled on the frame 10. Some of the pole components 30 may be inserted into a housing 12 provided on the frame 10. The pole component 30 may serve to accommodate and support a circuit breaker component of a main circuit portion of the vacuum circuit breaker 1. The pole component 30 may be made to be surrounded by an external insulator.

The pole portion 30 may accommodate a circuit breaker component 31 therein, and the circuit breaker component 31 may have a sealed surface. A component protecting portion 33 may be coupled to an upper portion of the circuit breaker component 31. The component protecting portion 33 may protect the circuit breaker component 31 from being damaged by injection pressure applied when the pole component 30 is manufactured.

A sealing ring 35 may be coupled to a lower portion of the circuit breaker component 31 so as to maintain a sealed state when the pole component 30 is coupled onto the frame 10. An upper terminal 37, which is connected to a power source and a load, may be coupled to an upper portion of the component protecting portion 33. A lower terminal 39 may be coupled to one side of the circuit breaker component 31. The upper terminal 37 and the lower terminal 39 may be assembled into the circuit breaker component 31 by a bolt or the like.

The pole component 30 having the above-described configuration may be protected by the external insulator. The external insulator may be molded by an injection method using a mold 70.

As shown in FIG. 3, a main process for manufacturing the pole component 30 may include a step of inserting the pole component 30 into the mold 70, and then fixing the pole component by inserting a fixing pin 74 to fix the upper terminal 37 and the lower terminal 39 therein.

Thereafter, when resin is filled through a resin injection hole 72 located at an upper portion of the mold 70, the external insulator 50 may be molded as shown in FIG. 4. When injection pressure is applied to the mold 70 and molding is completed, an operator may remove the mold 70 to extract the pole component 30.

But, there is a risk of the circuit breaker component 31 being damaged because the injection pressure is high during molding, so that the injection pressure is inevitably limited. In order to prevent the circuit breaker component 31 from being damaged, it is necessary to include the component protecting portion 33, thereby increasing a manufacturing cost.

In addition, when a molded state is poor or the pole component 30 needs to be replaced due to an external force or contamination, the pole component 30 extruded integrally with the external insulator 50 cannot be recycled. Therefore, there is a problem in that the manufacturing cost is increased because the high priced main circuit breaker component 31 has to be disposed together.

SUMMARY OF THE INVENTION

Embodiments of the present disclosure provide a pole component assembly for a circuit breaker capable of preventing a main circuit breaker component from being contaminated or deformed.

Objects of the present disclosure are not limited to the aforementioned objects, and the other objects and advantages of the present disclosure will become apparent from the following description of embodiments. In addition, it is easily understood that the objects and advantages of the present disclosure can be achieved by the means described in the claims and a combination thereof.

According to embodiments of the present disclosure, there is provided a pole component assembly for a circuit breaker. The pole component assembly for a circuit breaker may include an external insulating housing made by injecting resin to a housing mold, and then applying injection pressure to the housing mold to mold the resin and separating the molded resin from the housing mold, and a circuit breaker portion assembly detachably inserted into the external insulating housing after the external insulating housing is made, and the main body may have an outer circumferential surface coated with an elastomer, and an upper end thereof may be most thickly coated.

The external insulating housing may be made by injecting the resin into the housing mold in a state where an upper terminal and a lower terminal electrically connected to the circuit breaker portion assembly and connected to an external power source are inserted into the housing mold.

The external insulating housing may include a lower body provided with a lower terminal accommodating portion corresponding to a location of the lower terminal and an upper body provided with an upper terminal accommodating portion corresponding to a location of the upper terminal and formed integrally with an upper portion of the lower body, and the upper body may have a shape in which a diameter of a portion thereof decreases toward an upper portion thereof.

The circuit breaker portion assembly may be accommodated in the upper body, have a shape corresponding to a shape of the upper body and include a main body provided with a fixing electrode and an operating electrode therein, an insulating rod provided in an lower portion of the main body and coupled to the operating electrode to move the operating electrode up and down, and a current carrying portion coupled to the insulating rod 590 to be connected to an external terminal.

The upper body may include a first body formed to have a cylindrical shape, the first body connected to an upper end of the lower body and having the other end that extends upward, a second body formed to have a cylindrical shape, the second body having one end connected to an upper end of the first body and the other end that extends upward, and having a diameter that gradually decreases toward a upper portion thereof, and a third body formed to have a cylindrical shape, the third body having one end connected to the second body and the other end that extends upward.

The main body may have an outer circumferential surface coated with an elastomer.

The main body may include an inclined portion having an outer diameter that decreases toward an upper portion thereof to correspond to the second body.

The inclined portion of the main body may be coated with the elastomer that becomes thicker toward a lower portion thereof.

The main body may be formed in a size larger than an internal size of the upper body, and be inserted into the upper body with the coated elastomer compressed.

The main body may be formed to have an upper end thicker than a lower end or a portion corresponding to a location of the third body.

An upper portion of the upper terminal accommodating portion may be provided with a bolt fastening hole into which an assembly bolt is inserted, and the bolt fastening hole may be formed to pass through the upper terminal accommodating portion.

According to embodiments of the present disclosure, the external insulating housing may be molded without a main circuit breaker component when manufacturing a sealed type pole component, and the main circuit breaker component may be assembled into the finished external insulating housing, thereby preventing the main circuit breaker component from being contaminated or damaged.

DETAILED DESCRIPTION OF EXEMPLARY EMBODIMENTS

The above-described objects, features and advantages will be described in detail with reference to the accompanying drawings, so that those skilled in the art can easily carry out a technical idea of the present disclosure. In the description of the embodiments, the detailed description of well-known related configurations or functions will be omitted when it is deemed that such description will cause ambiguous interpretation of the present disclosure. Hereinafter, preferred embodiments of the present disclosure will be described in detail with reference to the accompanying drawings. In the drawings, same reference numerals designate same or like elements.

Hereinafter, a method of molding an external insulating housing for a circuit breaker portion assembly using a housing mold, and manufacturing a pole component for a circuit breaker to be coupled to the circuit breaker portion assembly will be described.

Figure 5:
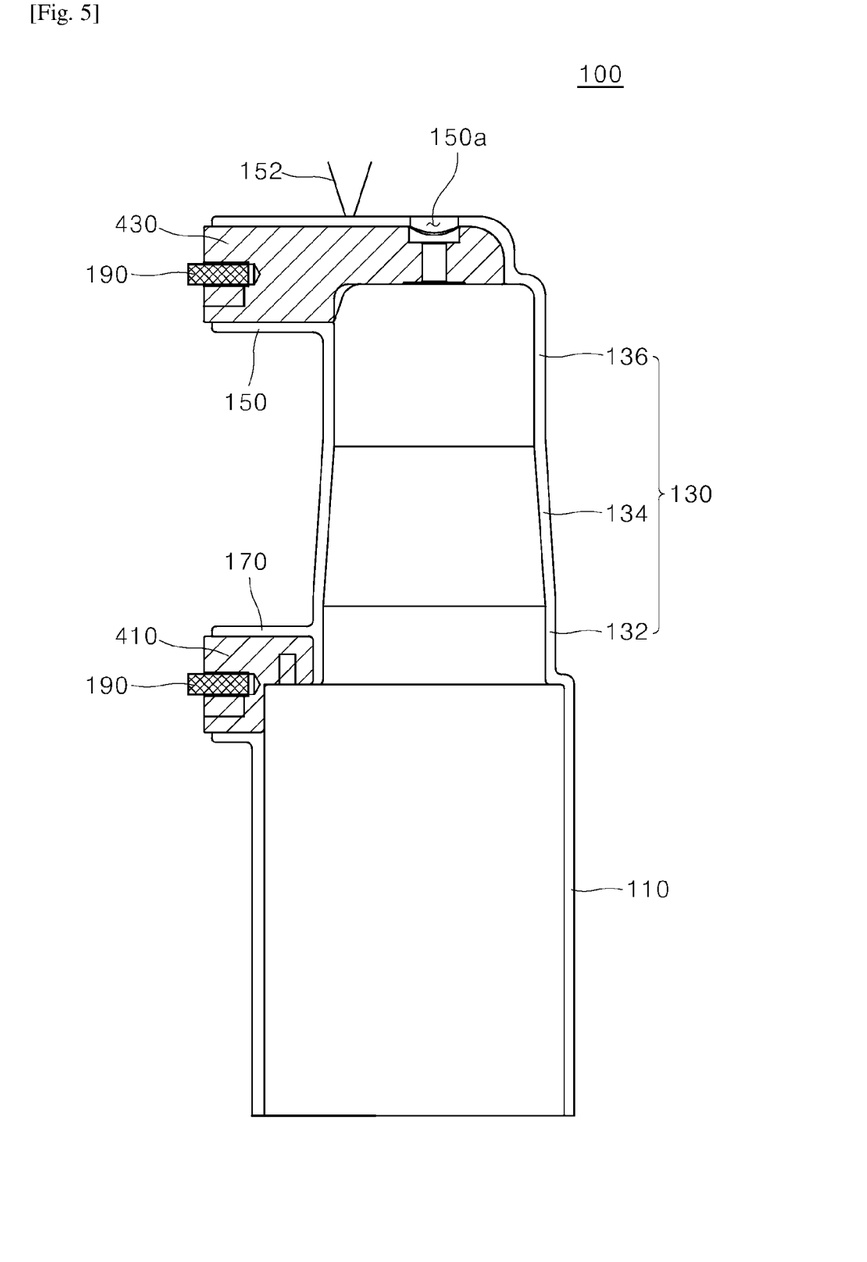
FIG. 5 is a sectional view showing a mold for manufacturing an external insulating housing according to an embodiment of the present disclosure.
Figure 6:
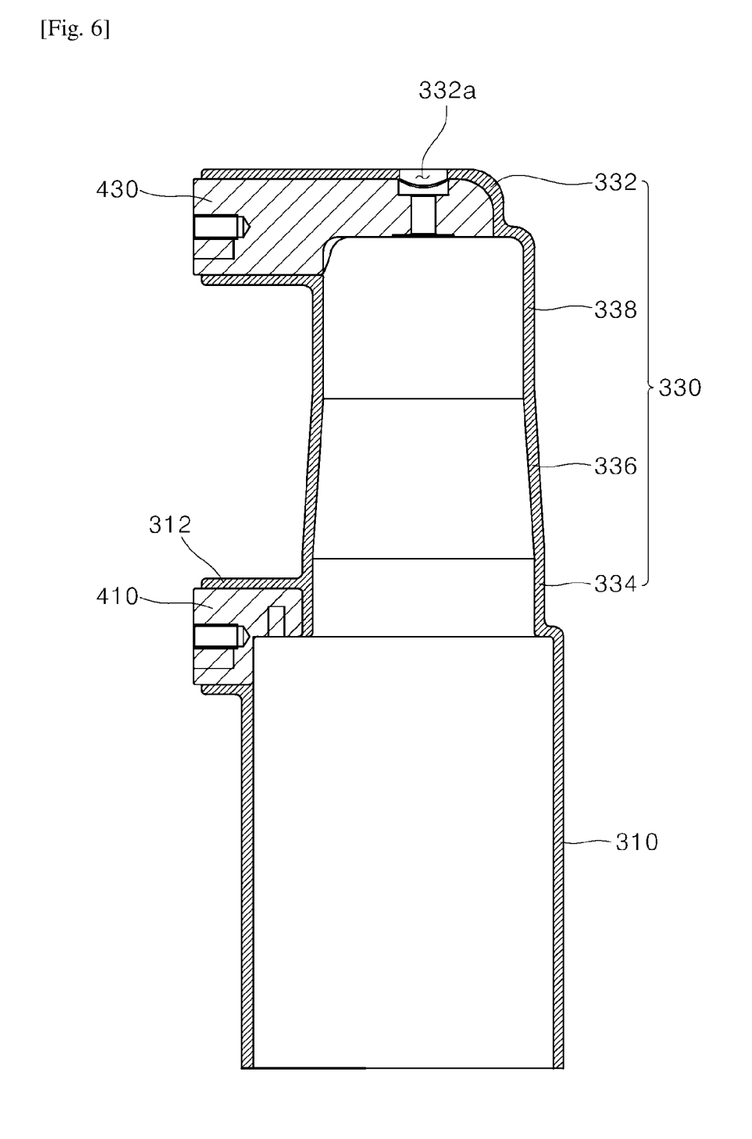
FIG. 6 is a sectional view of an external insulating housing manufactured by the mold of FIG. 5.
Figure 7:
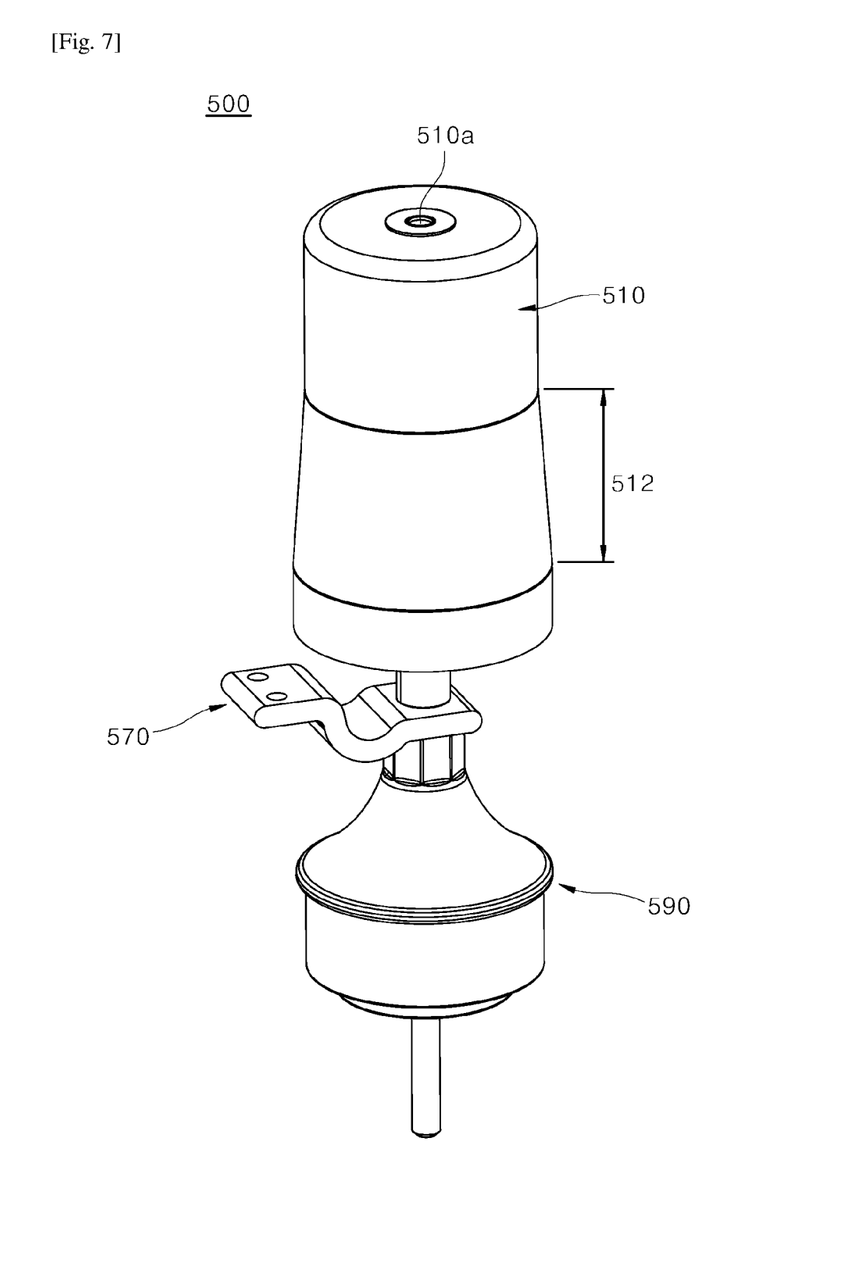
FIG. 7 is a perspective view showing a circuit breaker portion assembly accommodated within an external insulating housing manufactured by the mold of FIG. 5.
Figure 8:
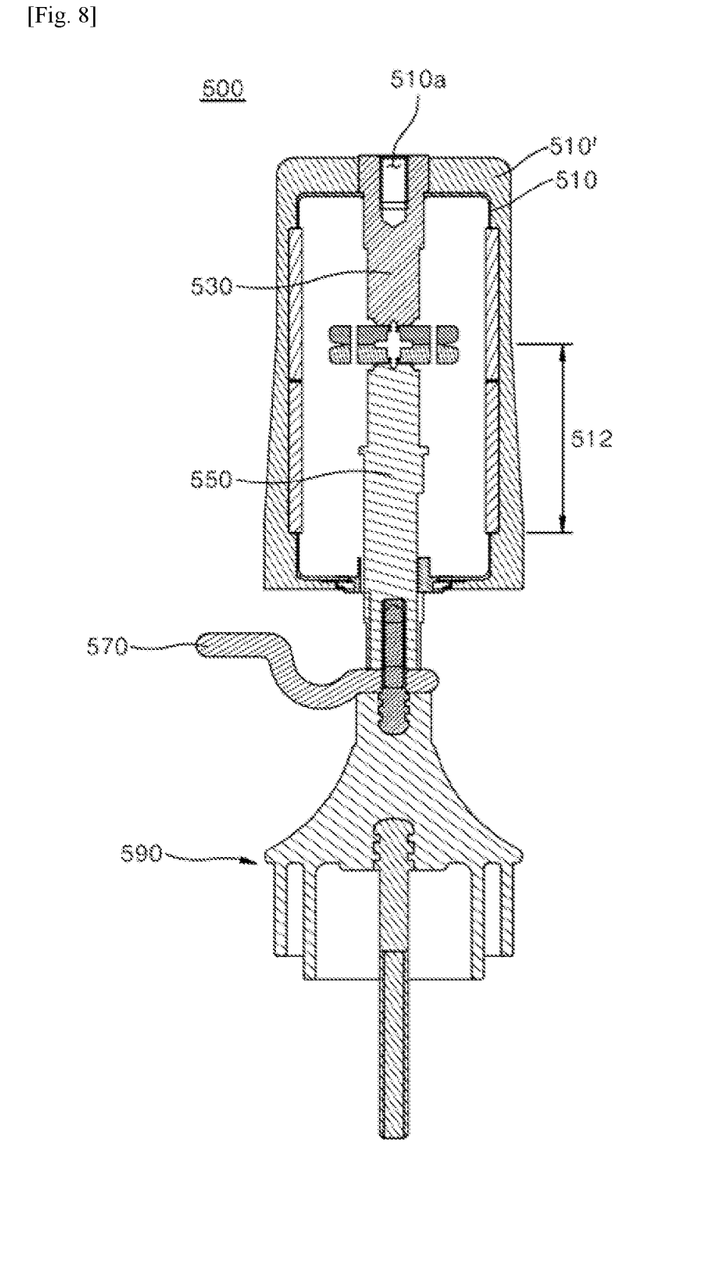
FIG. 8 is a sectional view of the circuit breaker portion assembly of FIG. 6.

FIG. 5 is a sectional view showing a mold for manufacturing an external insulating housing according to an embodiment of the present disclosure. FIG. 6 is a sectional view of an external insulating housing manufactured by the mold of FIG. 5. FIG. 7 is a perspective view showing a circuit breaker portion assembly accommodated within an external insulating housing manufactured by the mold of FIG. 5. FIG. 8 is a sectional view of the circuit breaker portion assembly of FIG. 6.

As shown in FIGS. 5 to 8, a pole component for a circuit breaker according to an embodiment of the present disclosure may be accommodated in an external insulating housing 300 made by means of a housing mold 100. The housing mold 100 to mold the external insulating housing 300 may be first used to mold only the external insulating housing 300 in a state where a circuit breaker portion assembly 500, which is a main circuit breaker component, is not assembled into the external insulating housing 300.

As shown in FIG. 5, the housing mold 100 may include a lower mold portion 110 to mold a lower shape of the external insulating housing 300 and an upper mold portion 130 formed integrally with the lower mold portion 110 to mold an upper shape of the external insulating housing 300.

An upper terminal coupling portion 150 may be formed integrally with an upper portion of the upper mold portion 130. A lower terminal coupling portion 170 may be formed integrally with one side of the lower mold portion 110. An upper terminal 430 and a lower terminal 410 may be coupled to the upper terminal coupling portion 150 and the lower terminal coupling portion 170, respectively. A terminal coupling pin 190 may be detachably coupled to the upper terminal 430 and the lower terminal 410.

The lower mold portion 110 is a lower mold to mold the lower shape of the external insulating housing 300. The lower mold portion 110 may have a substantially cylindrical shape. The lower terminal coupling portion 170 may be formed integrally with the one side of the lower mold portion 110, and be formed to communicate with the lower mold portion 110.

The lower terminal coupling portion 170 may have a substantially cylindrical shape. The lower terminal engaging portion 170 may protrude from the one side of the lower mold portion 110 in a direction perpendicular to the outer circumferential surface. The lower terminal 410 may be inserted into the lower terminal coupling portion 170. The lower terminal 410 may be formed integrally with one side of the lower body 310 of the external insulating housing 300 formed by the lower mold portion 110. Therefore, the lower terminal 410 may be previously inserted into the lower terminal coupling portion 170.

The upper mold portion 130 may be formed integrally with the lower mold portion 110. The upper mold portion 130 may have a shape corresponding to that of the circuit breaker portion assembly 500 and be formed to have a smaller diameter than the lower mold portion 110. One end of the upper mold portion 130 may be in communication with an upper end of the lower mold portion 110 and the other end of the upper mold portion 130 may be in communication with the upper terminal coupling portion 150. The upper mold portion 130 may include a first mold portion 132 that is in communication with the lower mold portion 110, a second mold portion 134 connected to an upper portion of the first mold portion 132, and a third mold portion 136 that is in communication with the upper terminal coupling portion 150.

The first mold portion 132 may have one end connected to the upper end of the lower mold portion 110 and the other end connected to the second mold portion 134. The first mold portion 132 may have a cylindrical shape. The first mold portion 132 may have a shape in which one end connected to the lower mold portion 110 has the same diameter as the other end. Alternatively, the first mold portion may have a shape in which a diameter thereof gradually decreases from one end connected to the lower mold portion 110 toward the other end. The above-described shape of the first mold portion 132 is intended to make a shape of the external insulating housing 300 corresponding to that of the circuit breaker portion assembly 500.

The second mold portion 134 may have one end connected to the first mold portion 132 and the other end connected to the third mold portion 136. The second mold portion 134 may have a cylindrical shape in which a diameter thereof gradually decreases toward an upper portion thereof. The above-described shape of the second mold portion 134 is also intended to make the shape of the external insulating housing 300 corresponding to that of the circuit breaker portion assembly 500.

The third mold portion 136 may have one end connected to the second mold portion 134 and the other end connected to the upper terminal coupling portion 150. The third mold portion 136 may have a cylindrical shape. The third mold portion may have a shape in which a lower portion thereof has the same diameter as an upper portion thereof. Alternatively, the third mold portion may have a shape in which a diameter thereof gradually decreases toward an upper portion thereof. The above-described shape of the third mold portion 136 is also intended to make the shape of the external insulating housing 300 corresponding to that of the circuit breaker portion assembly 500.

The upper terminal coupling portion 150 may be formed to protrude in the same direction as the lower terminal coupling portion 170 protrudes. A protruded one end portion of the upper terminal coupling portion 150 may have a substantially cylindrical shape and the other end portion of the upper terminal coupling portion 150 may be in communication with the third mold portion 136 of the upper mold portion 130. An upper portion of the upper terminal coupling portion 150 may be provided with a circular hole 150a corresponding to a bolt fastening hole 332a of the external insulating housing 300, and the hole 150a may be formed to pass through the upper terminal coupling portion 150. A resin injection portion 152 may be formed on an upper portion of the upper terminal coupling portion 150 spaced from the hole 150a.

The resin injection portion 152 may be a portion provided to inject resin into a mold, and the resin may be filled into the mold through the resin injection portion 152. The upper mold portion 130 and the lower mold portion 110 except the circular hole 150a formed in the upper terminal coupling portion 150 may be filled with resin to form the external insulating housing 300.

After the filling of the resin is completed, injection pressure may be applied to the mold to mold the external insulating housing 300. Thereafter, the external insulating housing 300 may be finished by removing the housing mold 100.

As shown in FIG. 6, the external insulating housing 300 finished by the above-described process may include a lower body 310, an upper body 330, and an assembly bolt 350. The assembly bolt 350 may couple the external insulating housing 300 with the circuit breaker portion assembly 500. The external insulating housing 300 may be made of resin, and accordingly may become an insulator that does not generally conduct electricity.

The lower body 310 may be formed by the lower mold portion 110, and accordingly the lower body 310 may have a cylindrical shape and be provided with a lower terminal accommodating portion 312 at one side thereof. The lower terminal 410 may be coupled to the interior of the lower terminal accommodating portion 312.

The upper body 330 may be formed integrally with an upper end of the lower body 310. The upper body 330 may be provided with a first body 334 to a third body 338 corresponding to the first mold portion 132 to the third mold portion 136. The upper body 330 may be provided with an upper terminal accommodating portion 332 at an upper end thereof. The upper terminal 410 may be coupled to the interior of the upper terminal accommodating portion 332. The upper terminal accommodating portion 332 may be provided with the bolt fastening hole 332a into which the assembly bolt 350 is inserted. The bolt fastening hole 332a may be formed to pass through the upper terminal accommodating portion 332.

The first body 334 may have a lower end connected to the lower body 310 and an upper end connected to the second body 336. The first body 334 may have a cylindrical shape in which the lower end has the same diameter as the upper end. Alternatively, the first body 334 may have a cylindrical shape in which a diameter thereof gradually decreases from the lower end toward the upper end.

The second body 336 may have a lower end connected to the first body 334 and an upper end connected to the third body 338. The second body 336 may have a cylindrical shape in which a diameter thereof gradually decreases from the lower end toward the upper end.

The third body 338 may have a lower end connected to the second body 336 and an upper end connected to the upper terminal accommodating portion 332. The third body 336 may have a cylindrical shape in which the lower end has the same diameter as the upper end. Alternatively, the third body 338 may have a cylindrical shape in which a diameter thereof gradually decreases from the lower end toward the upper end.

As described above, the upper body 330 may have a portion (the second body) whose diameter gradually decreases toward an upper portion thereof, and accordingly the circuit breaker portion assembly 500 may be accommodated therein and closely coupled thereto. The circuit breaker portion assembly 500 may have a shape corresponding to that of the external insulating housing 300. The circuit breaker portion assembly 500 may be coupled to the external insulating housing 300 by means of the assembly bolt 350.

As shown in FIGS. 7 and 8, the circuit breaker portion assembly 500 may be a vacuum interrupter among the main circuit breaker components. The circuit breaker portion assembly 500 may include a main body 510 and 510' that forms an external appearance, an insulating rod 590 connected to a lower portion of the main body 510 and 510' and a current carrying portion 570 inserted into the insulating rod 590. A fixing electrode 530 and an operating electrode 550 may be accommodated in the circuit breaker portion assembly 500.

An interior upper portion of the main body 510 and 510' may be provided with the fixing electrode 530. The fixing electrode 530 may be electrically connected to the upper terminal 430. The operating electrode 550 may be provided at an interior lower portion of the main body 510 and 510'. The operating electrode 550 may be moved up and down by the insulating rod 590. The current carrying portion 570 to connect the external terminal to the electrode may be coupled to the insulating rod 590.

The circuit breaker portion assembly 500 may be in electrically communication with the external power source through contact between the fixing electrode 530 and the operating electrode 550, and the current carrying portion 570. The insulating rod 590 may move the operating electrode up and down to perform functions of conduction and cutoff (a main structure and function of the circuit breaker portion assembly may employ a conventional structure, and thus the detailed descriptions thereof will be omitted and only the parts related to a gist of the present disclosure will be described).

The main body may include a frame 510 and an elastomer 510' coated on the frame 510. The elastomer 510' may have a thickness varying according to a location of the frame 510. The frame 510 may have a shape corresponding to that of the upper body 330. Accordingly, the frame 510 may have an inclined portion 512 corresponding to an inclined structure of the second body 336 on an outer circumferential surface thereof.

The main body includes the elastomer 510' coated on the frame 510, and accordingly the elastomer 510' coated to form an inclined portion corresponding to a shape of the upper body 330 may have a varying thickness.

That is, a portion of the main body 510 and 510' corresponding to the second body 336 may be thicker toward a lower end thereof. A portion of the outer circumferential surface of the main body 510 and 510' corresponding to the first body 334 may be thicker than the portion corresponding to the second body 336.

The main body 510 and 510' may form the inclined portion 512 according to such a shape. The main body 510 and 510' may have a shape in which an outer diameter thereof gradually decreases toward an upper portion thereof corresponding to a shape in which a diameter of the second body 336 gradually decreases toward an upper portion of the second body 336.

Also, the main body 510 and 510' may be preferably accommodated in a fully sealed state when accommodated in the external insulating housing 300. Accordingly, the main body 510 and 510' may be formed in a size slightly larger than an internal size of the upper body 330.

For this reason, the thickness of the elastomer 510' coated on the frame 510 may be set. The elastomer 510' may be coupled to an inner circumferential surface of the upper body 330 in a close and compressive manner in a state where the main body 510 and 510' is inserted into the external insulating housing 300.

In addition, the main body 510 and 510' may preferably have an upper end portion thicker than a lower end portion or a portion corresponding to the third body 338 to withstand injection pressure applied during injection molding. Therefore, in FIG. 8, a first portion of the elastomer 510' corresponding to the upper end portion of the frame 510 may be the thickest and a second portion of the elastomer 510' corresponding to the first body 334 and the second body 336 may be the next thickest. A third portion of the elastomer 510' corresponding to the lower end portion of the frame 510, which is least influenced by the injection pressure, may be the thinnest.

Figure 9:
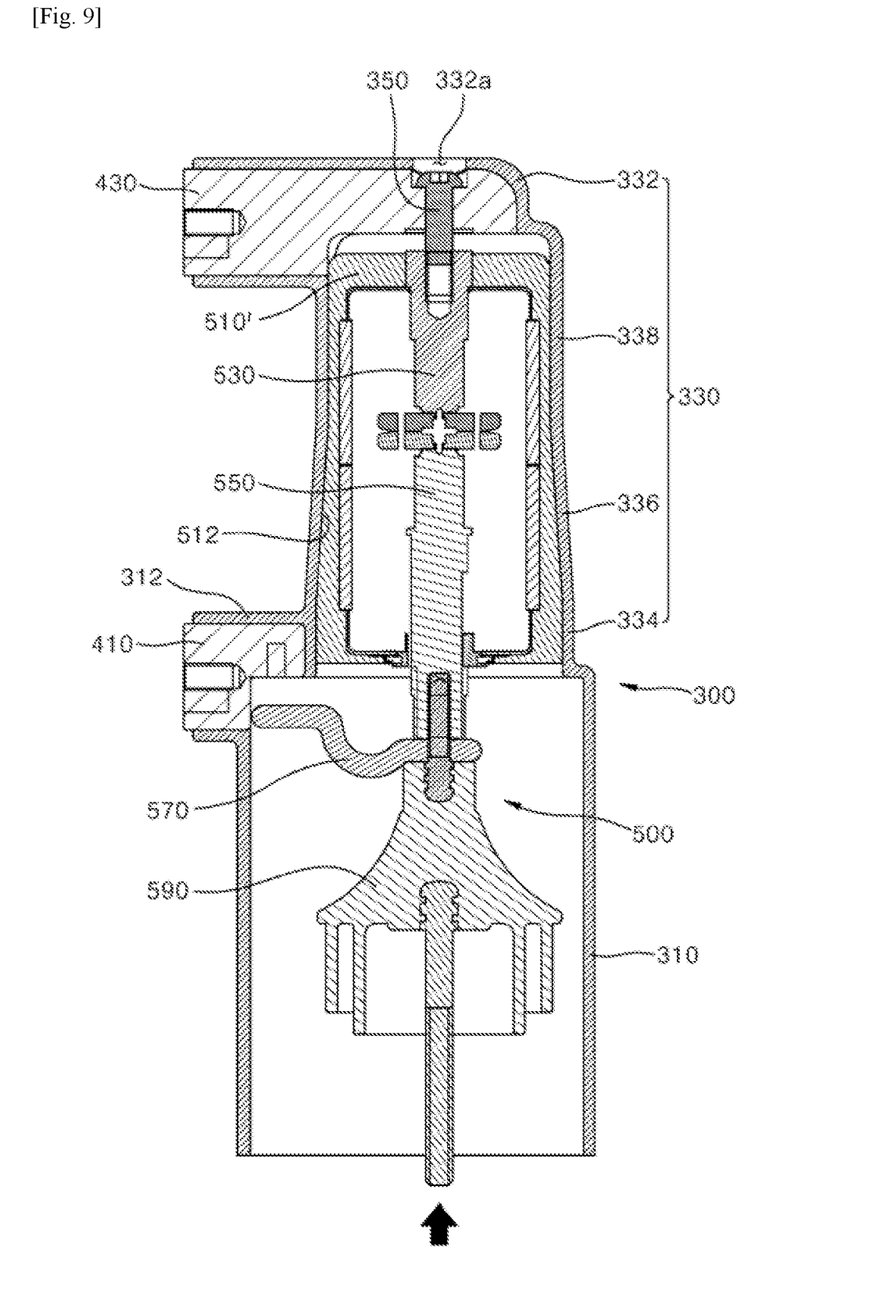
FIG. 9 is a sectional view showing an assembling process of an external insulating housing and a circuit breaker portion assembly manufactured by a pole component manufacturing method according to embodiments of the present disclosure.
Figure 10:
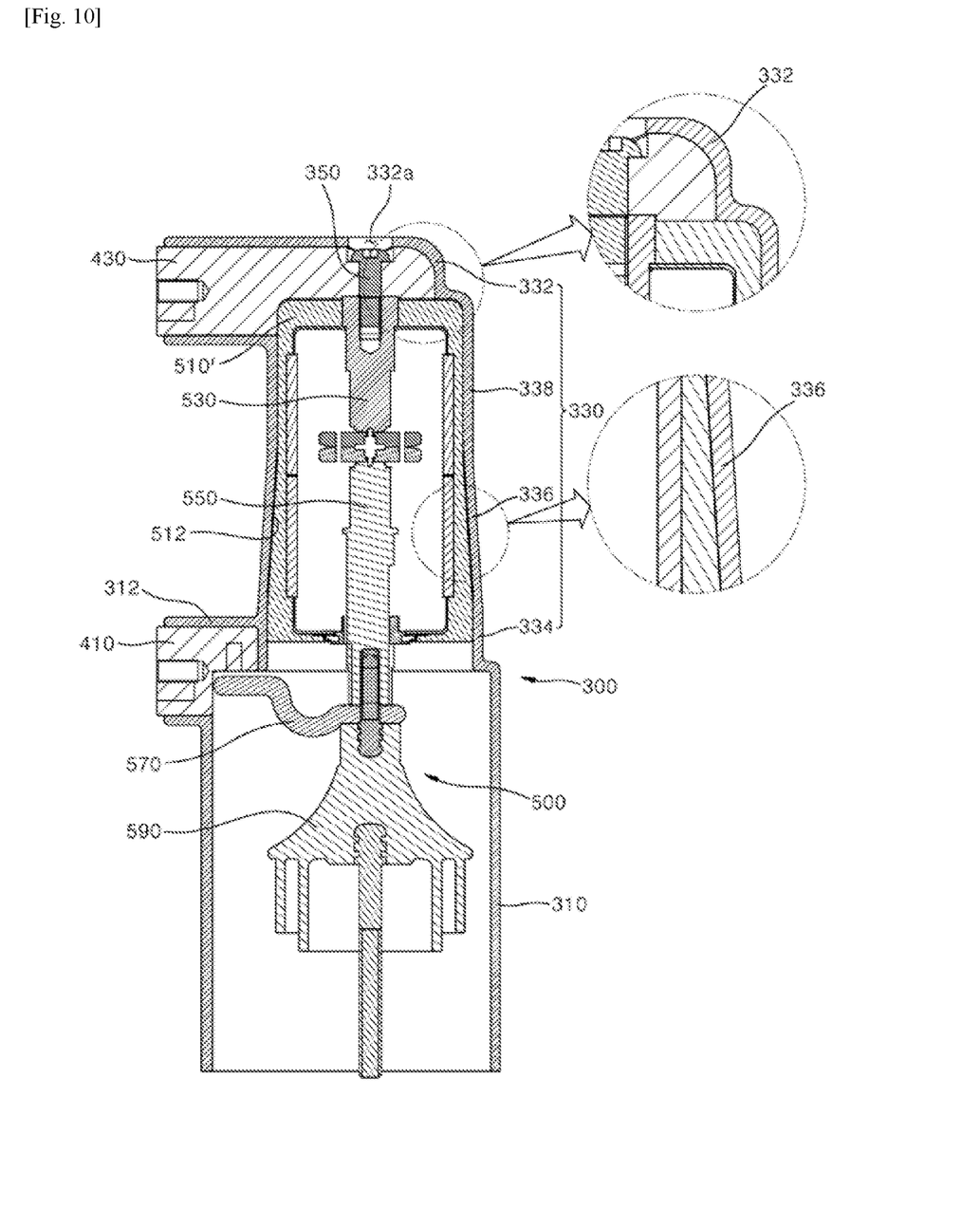
FIG. 10 is a sectional view showing an assembled state of an external insulating housing and a circuit breaker portion assembly manufactured by a pole component manufacturing method according to embodiments of the present disclosure.

FIG. 9 is a sectional view showing an assembling process of an external insulating housing and a circuit breaker portion assembly manufactured by a pole component manufacturing method according to embodiments of the present disclosure. FIG. 10 is a sectional view showing an assembled state of an external insulating housing and a circuit breaker portion assembly manufactured by a pole component manufacturing method according to embodiments of the present disclosure.

As shown in FIG. 9, after the external insulating housing 300 is molded, the circuit breaker portion assembly 500 may be inserted into the external insulating housing 300 to finish the pole component for a circuit breaker. At this time, the circuit breaker portion assembly 500 may be pressed upward along an arrow direction such that the circuit breaker portion assembly 500 is assembled into the external insulated housing 300.

The diameter of the upper body 330 of the external insulating housing 300 may gradually decrease, and accordingly the circuit breaker portion assembly 500 may be inserted into the upper body 330 with the elastomer 510' compressed.

As shown in FIG. 10, when the circuit breaker portion assembly 500 is fully assembled into the external insulating housing 300, the main body 510 and 510' and the upper body 330 may be in close contact with each other without a spaced portion. The main body 510 and 510' may be formed in a size slightly larger than the internal size of the upper body 330, and accordingly the elastomer 510' may be compressed to enhance adhesion.

More specifically, the upper portion of the main body 510 and 510' and the upper portion of the upper body 330 may be tightly coupled to each other as the elastomer 510' is compressed as shown in the enlarged view of FIG. 10. The inclined portion 512 of the main body 510 and 510' and the second body 336 of the upper body 330 may be tightly coupled to each other as the elastomer 510' is compressed.

The circuit breaker portion assembly 500 may be assembled into the external insulating housing 300 by compression of the elastomer 510'. Therefore, when separating the circuit breaker portion assembly 500 from the external insulating housing 300, the circuit breaker portion assembly 500 may be separated without being damaged by applying a force greater than a compression force of the elastomer.

As described above, the external insulating housing 300 may be made in a state where the circuit breaker portion assembly 500 is not assembled into the external insulating housing 300 when the pole component is manufactured. Thereafter, the circuit breaker portion assembly 500 may be assembled into the external insulating housing 300, so that there is no limit with respect to molding pressure applied when the external insulating housing 300 is molded.

Also, the external insulating housing 300 may be formed without the circuit breaker portion assembly 500, and thus it is possible to eliminate a separate component for pressure protection, thereby reducing a manufacturing cost. Moreover, the circuit breaker portion assembly 500 may be separably assembled, and thus the circuit breaker portion assembly 500 may not be wasted even when the external insulating housing 300 is poor in terms of a molded state, and discarded. Therefore, when using the circuit breaker portion assembly according to embodiments of the present disclosure, it may be economical and reduce a maintenance cost.

The present disclosure described as above is not limited by the embodiments described herein and accompanying drawings. It should be apparent to those skilled in the art that various substitutions, changes and modifications which are not exemplified herein but are still within the spirit and scope of the present disclosure may be made. The embodiments should be considered in descriptive sense only and not for purposes of limitation. Therefore, the scope of the invention is defined not by the detailed description but by the appended claim.

What is claimed is:

1. A pole component assembly for a circuit breaker, comprising:
   a circuit breaker portion assembly having a main body provided with a fixing electrode and an operating electrode therein, an insulating rod provided in an lower portion of the main body and coupled to the operating electrode to move the operating electrode up and down, and a current carrying portion coupled to the insulating rod to be connected to an external terminal; and,
   an external insulating housing having a lower body and an upper body, the lower body provided with a lower terminal accommodating portion to accommodate a lower terminal electrically connected to the circuit breaker portion assembly, and the upper body provided with an upper terminal accommodating portion to accommodate an upper terminal electrically connected to the circuit breaker portion assembly, the upper body formed integrally with an upper portion of the lower body and having a shape in which a diameter of a portion thereof gradually decreases toward an upper portion thereof, and
   wherein the main body includes a frame and an elastomer coated on an outer circumferential surface of the frame, and a first portion of the elastomer corresponding to an upper end of the frame is most thickly coated.

2. The pole component assembly for a circuit breaker according to claim 1, wherein
   the external insulating housing is made by injecting resin into a housing mold, and then applying injection pressure to the housing mold to mold the resin and separating the molded resin from the housing mold.

3. The pole component assembly for a circuit breaker according to claim 2, wherein
   the circuit breaker portion assembly is detachably inserted into the external insulating housing after the external insulating housing is made.

4. The pole component assembly for a circuit breaker according to claim 3, wherein
   the external insulating housing is made by injecting the resin into the housing mold in a state where the upper terminal and the lower terminal are inserted into the housing mold.

5. The pole component assembly for a circuit breaker according to claim 4, wherein
   the upper body includes:
   a first body formed to have a cylindrical shape, the first body having one end connected to an upper end of the lower body and the other end that extends upward;
   a second body formed to have a cylindrical shape, the second body having one end connected to an upper end of the first body and the other end that extends upward, and having a diameter that gradually decreases toward a upper portion thereof; and
   a third body formed to have a cylindrical shape, the third body having one end connected to the second body and the other end that extends upward.

6. The pole component assembly for a circuit breaker according to claim 5, wherein
   the main body includes an inclined portion having an outer diameter that decreases toward an upper portion thereof to correspond to the second body.

7. The pole component assembly for a circuit breaker according to claim 6, wherein
   a second portion of the elastomer corresponding to the inclined portion has a thickness which becomes thicker toward a lower portion of the inclined portion.

8. The pole component assembly for a circuit breaker according to claim 7, wherein
   the main body is formed in a size larger than an internal size of the upper body, and inserted into the upper body with the elastomer compressed.

9. The pole component assembly for a circuit breaker according to claim 5, wherein
   the main body is formed to have an upper end portion thicker than a lower end portion or a portion corresponding to a location of the third body.

10. The pole component assembly for a circuit breaker according to claim 1, wherein
    the upper terminal accommodating portion has an upper portion provided with a bolt fastening hole into which an assembly bolt is inserted, the bolt fastening hole formed to pass through the upper terminal accommodating portion.

* * * * *